United States Patent [19]

Butte

[11] Patent Number: 5,075,668
[45] Date of Patent: Dec. 24, 1991

[54] HOOD ORNAMENT ALARM

[76] Inventor: Charles D. Butte, 12947 San Vicente Blvd., Los Angeles, Calif. 90049

[21] Appl. No.: 332,357

[22] Filed: Mar. 31, 1989

[51] Int. Cl.$^5$ .................................................. B60Q 1/00
[52] U.S. Cl. .................................. 340/426; 340/568; 307/10.2
[58] Field of Search ............... 340/426, 429, 568, 571, 340/686, 687; 307/10.2; 180/287; 200/61.54, 61.55, 61.56

[56] References Cited

U.S. PATENT DOCUMENTS

| 1,716,373 | 6/1929 | Ellis | 200/61.55 |
| 4,137,521 | 1/1979 | Martinez | 340/426 |
| 4,293,860 | 10/1981 | Iwata | 340/429 X |
| 4,542,373 | 9/1985 | Hillock | 340/568 |
| 4,783,352 | 11/1988 | Kaiser, Jr. | 40/591 X |
| 4,785,144 | 11/1988 | Fosnaugh et al. | 200/61.55 |
| 4,788,550 | 11/1988 | Chadima, Jr. | 343/712 |
| 4,796,002 | 1/1989 | Heidman, Jr. | 340/428 X |
| 4,882,563 | 11/1989 | Perlman et al. | 340/426 |

Primary Examiner—Jin F. Ng
Assistant Examiner—Brian R. Tumm
Attorney, Agent, or Firm—Lyon & Lyon

[57] ABSTRACT

An alarm for protecting automobile or motor vehicle hood ornaments from theft or vandalism. The alarm comprises a hollow conductive body section having a spring loaded assembly positioned within the body section. One end of the spring loaded assembly is connected to the hood ornament and the other end of the assembly supports a conductive contact spaced apart from the body section whereby upon displacement of the hood ornament beyond a predetermined distance the contact is brought into engagement with the conductive body section completing the electrical circuit and sounding the vehicle's horn.

6 Claims, 1 Drawing Sheet

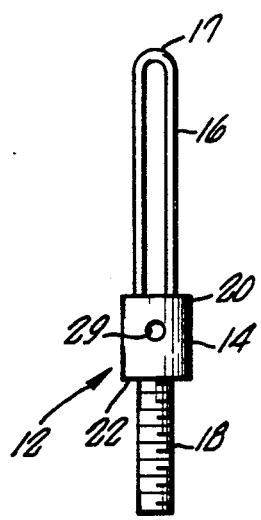
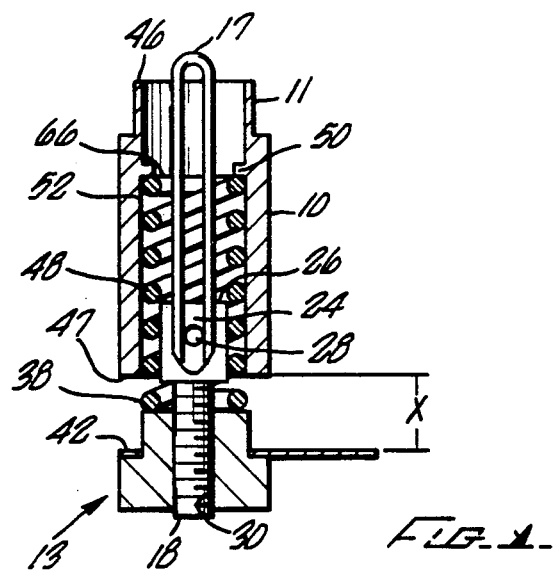
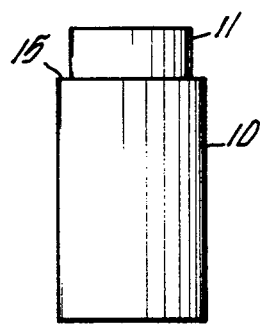
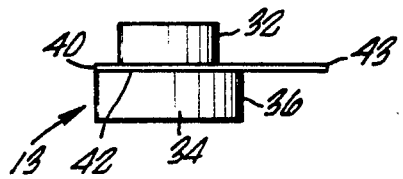
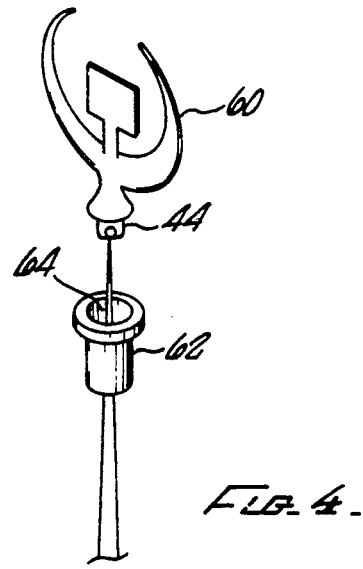
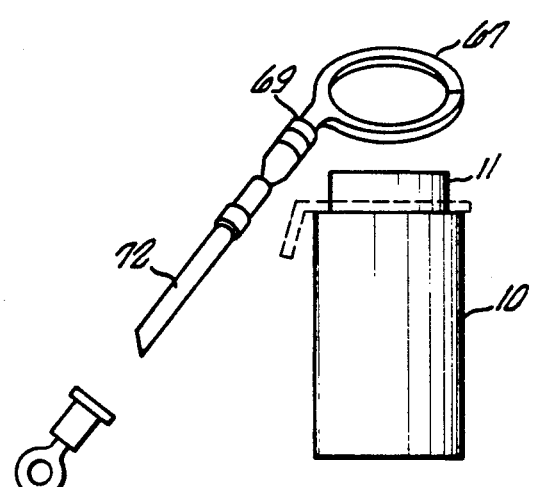
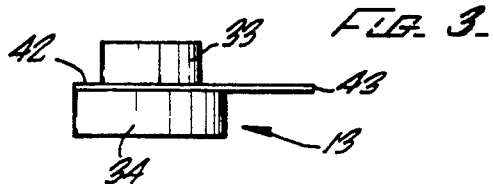

HOOD ORNAMENT ALARM

FIELD OF INVENTION

This invention relates to the field of alarm systems utilized in connection with motor vehicles. More particularly it relates to the field of alarms for deterring the theft of automobile hood ornaments.

BACKGROUND OF INVENTION

Automobile manufacturers commonly affix decorative ornaments to the hood or front grill section of the vehicle. Usually these hood ornaments incorporate the trademark or logo of the manufacturer. In most instances the hood ornaments extend vertically upward from the top of the vehicle's hood. For safety reasons and to accommodate modern day car washes the ornaments are frequently flexibly spring mounted to allow the ornament to bend over or tilt, without breaking, when encountering an obstacle.

A problem, however, has arisen with respect to the theft of hood ornaments from automobiles Either through simple vandalism or intentional theft hood ornaments are being stolen from the vehicles on a more frequent basis. This may be due in part to the increasing public awareness and popularity of brand names and logos. Whatever the motivational factors behind the theft of these hood ornaments a means of deterrence is needed to stop these thefts from occurring.

Prior alarm or deterrent means have consisted primarily of traditional automotive burglar alarms. These alarm systems are quite expensive and are constructed to sound an alarm whenever any portion of the vehicle is tampered with. The only prior system directed solely to an alarm for the hood ornament is one manufactured by Pro-Tek Emblem Guard. The Pro-Tek device is unsatisfactory due to its construction and the time consuming installation procedure resulting from its peculiar construction. This device utilizes a dual-body construction incorporating spaced-apart, single point contacts which must be properly spaced and aligned in order for the device to function. Due to vibration of the unit during the opening and closing of the hood of the vehicle and also during normal vehicle operation this prior unit may shift out of alignment thereby rendering the alarm inoperable.

A need therefore exists for an inexpensive, simple to install hood ornament alarm. A need also exists for a hood ornament alarm having a uni-body construction which eliminates the problem of having to align spaced apart contacts.

SUMMARY OF INVENTION

The subject invention is directed to a hood ornament alarm which sounds the vehicle's horn whenever the hood ornament is displaced beyond a predetermined position. The hood alarm is connected to the hood ornament and is mounted on the underside of the vehicle's hood, within the engine compartment. The alarm includes a hollow cylindrical conductive body section mounted underneath and in contact with the hood ornament base. This body section is grounded to the vehicle's hood. A spring-loaded center pole is connected to the hood ornament by means of a wire connector which passes through the base of the ornament and engages the ornament. A contact is mounted upon an insulator adjustably affixed to the end of the center pole. Wiring means connect the contact to the vehicle's horn circuit. The insulator is adjusted on the end of the center pole such that a predetermined spacing exists between the contact mounted on the insulator and the bottom end of the conductive body section.

When the ornament is displaced beyond a pre-set limit the contact is brought into engagement with the body section thereby completing the circuit and sounding the vehicle's horn.

DESCRIPTION OF THE DRAWINGS

FIG. 1 is a cross-sectional side view of the subject alarm.

FIG. 2 is a partial exploded side view of the alarm.

FIG. 3 is a side view of the alarm grounding means.

FIG. 4 is a perspective view of a hood ornament to which the subject alarm is intended to be attached.

DETAILED DESCRIPTION OF THE PREFERRED EMBODIMENT

The components of the subject hood ornament alarm are set forth in FIGS. 1—3. As illustrated in FIG. 2 the alarm includes a hollow conductive body section 10, a center connector assembly 12 and a non-conductive nut 13. In the preferred embodiment the body section 10 is of a cylindrical configuration, however, in alternate embodiments the body section can be of any external configuration such as rectangular or polygonal. As shown in FIG. 2 the upper end of body section 10 has an inwardly stepped section 11 having a smaller external diameter than main body section 10. Ground support shoulder 15 is formed by the stepped section 11.

Additionally, as shown in FIG. 1, an inwardly projecting annular flange 50 is located at an intermediate position within the body section 10. The bottom of the flange 50 forms spring shoulder 52.

The center connector assembly 12 is comprised of a center post 14 and a connecting wire 16. As shown in FIG. 2 the center post 14 has a lower retaining end 18 which in the preferred embodiment is threaded. The upper end 20 of the center post 14 is of a greater diameter than the retaining end 18 thereby forming shoulder 22. As shown in FIG. 1 a recess 24 is formed in the top end 26 of the upper end 20. The recess 24 extends partially along the length of the upper end 20. Threaded apertures 28 are located through the walls of the upper end 20 and connect the exterior of the upper end 20 with the recess 24. In the preferred embodiment a pair of apertures 28 are located on opposing sides of the upper end 20.

The connecting wire is configured in the shape of an elongated "U". The open end of the wire 16 is inserted within the recess 24. A set screw 29 is then threaded into one of the apertures 28 and tightened until it engages and locks the wire 16 within the recess 24. The closed end of the wire 17 then extends outward above the center post 14.

The retaining nut 13 has a threaded aperture 30 passing axially through the body of the nut as shown in FIG. 1. The retaining nut 13 has upper and lower sections 32 and 34. Section 34 is formed by an annular flange 36 which extends outward about the lower section 34. Shoulder 40 is formed by the upper surface of flange 36. The external diameter of the upper section 32 is less than the internal diameter of the body section 10. The external diameter of the lower section 34 is greater than the internal diameter of the body section 10. In the preferred embodiment the diameter of the lower section 34 is equal to the external diameter of the body section 10.

An annual groove 38 is formed in the base of upper section 32 adjoining shoulder 40. A conductive connector in the form of a ring 42 is mounted atop shoulder 40. The ring 42 has an internal diameter slightly less than the external diameter of upper section 32 and slightly greater than the internal diameter of annular groove 38. When assembled the ring 42 is press fit over the upper section 32 and snapped into groove 38. A spade connector 43 extends outward from the side of the ring 42 as shown in FIG. 2.

The mounting of the subject alarm will now be described. First the hood ornament 60 is removed from the hood of the vehicle. This is accomplished by removing the retaining clip or nut or other fastening means (not shown) underneath the hood. This releases the ornament 60 and allows for it to be removed from the hood. The existing spring and wire of the hood ornament assembly are discarded. The connector wire 16 is connected to the bottom of the hood ornament as shown in FIG. 4. The open end of the wire 16 is slipped over the fastening member 44 located at the bottom of the ornament. The wire 16 is then arranged such that the fastening member 44 rests within closed end 17.

The ornament 60 is then re-inserted within the ornament base 62 with the wire 16 passing through aperture 64 in the center of the base as shown in FIG. 4. At this point the open end of wire connector 16 is inserted within recess 24 in the center pole 14 and locked in place by means of set screw 29. The ornament base 62 is then re-installed in the vehicle hood utilizing the original washers, seals, gaskets and retaining means.

Next the conductive body section 10 is mounted on the underneath side of the hood of the vehicle. Prior to mounting the body section 10 a ground ring 67 is inserted over the stepped section 11 as shown in FIG. 3. The ground ring 67 rests upon ground support shoulder 15. A spade connector 69 extends outward from ground ring 67. The body section 10, with ground ring 67 attached, is slipped over the center connector assembly 12 and placed so that the top 46 of the body section 10 is in contact with the underneath side of the ornament base 62. Spring 48 is then inserted within the body section 10 such that center post 14 passes through the center of the spring 48. The spring 48 is inserted into the body section 10 until the upper end 66 of the spring 48 comes into contact with shoulder 52 as shown in FIG. 1. Retainer nut 13, with conductive connector ring 42 mounted thereon, is then threaded onto the lower end 18 of center post 14. The retaining nut 13 is then tightened, thereby compressing the spring 48 and drawing the ornament 60 firmly into the base 62 until the gap or spacing between the bottom 47 of the body section 10 and the top of the conductive connector ring 42 (indicated by distance "x" in FIG. 1) reaches a predetermined distance. In the preferred embodiment this distance is approximately 5/16 of an inch.

A ground wire is then fastened to the spade connector 69 and then fastened to the hood safety latch mechanism. This may be done by removing a screw from the safety latch and placing a connector eyelet 70, which is connected to the end of the ground wire 72, over the screw and re-fastening the screw into the hood safety latch.

The conductive connector ring 42 is then connected to the vehicle's horn circuit by wiring mean not shown. In a preferred embodiment one end of the wiring means is connected to the horn circuit at a location within the passenger compartment of the vehicle. A suitable location would be near the base of the steering column where the horn circuit wiring would be located in most vehicles. The other end of the wiring means is connected to spade connector 43. The actual means of connecting the wiring is known to persons of ordinary skill in the art and is not claimed to be part of the subject invention. By wiring the ornament alarm into the horn circuit the subject invention utilizes the vehicle's existing fuses and relays and eliminates the need for provision of a separate set of fuses and relays as is required in existing alarm systems.

In operation the alarm is adjusted such that the ornament must be moved beyond a predetermined point before the horn is sounded. In the preferred embodiment this distance is set to enable the ornament 60 to be tilted up to a 45° angle. Thus, any accidental movement of the hood ornament 60 will not set off the alarm. Should the ornament be pulled or lifted vertically the alarm will be sounded. The degree of allowable movement of the ornament may be adjusted by means of tightening or loosening the retaining nut 13.

Having thus described one embodiment of my invention in detail, it is to be understood that numerous equivalents and alterations which do not depart from the invention will be apparent to those skilled in the art, given the teaching herein. Thus, my invention is not to be limited to the above description, but is to be the full scope of the appended claims.

What is claimed:

1. A motor vehicle hood ornament alarm for use in connection with the vehicle's existing horn system comprising:
    a hollow conductive body section;
    engagement means for connecting to a hood ornament, said engagement means mounted within and extending through said hollow conductive body section, and the engagement means comprising an elongated center member threaded at one end and having a recessed section at the other end and further having a loop member extending from said recess;
    a conductive contact;
    flexible separating means for separating said conductive contact from said conductive body section;
    a retaining means; and
    wiring means for connecting the hood ornament alarm to the vehicle's horn system, said retaining means being engaged with said engagement means to retain the separating means disposed between the conductive contact and the conductive body section.

2. The hood ornament alarm of claim 1 wherein the retaining means is a threaded nut, said nut being constructed from a non-conductive material.

3. The hood ornament alarm of claim 1 wherein the flexible separation means is a coil spring.

4. A motor vehicle hood ornament alarm for use with a horn system comprising:
    a hollow conductive body section having a substantially cylindrical bottom;
    engagement means for connecting to a hood ornament, said engagement means adapted to be mounted within and extending through said hollow conductive body section;
    an insulating retaining means connected with said engagement means;

a substantially circular conductive contact disposed on the retaining means, flexible separating means for normally separating said conductive contact from said bottom of said conductive body section, and wherein attempted removal of the hood ornament causes the engagement means to pull the conductive contact on the retaining means into contact with the bottom of the body section.

5. A motor vehicle hood ornament alarm for use in connection with the vehicle's existing horn system comprising:

a hollow conductive body section having an inwardly projecting annular flange located at an intermediate position within said body section;

a spring member positioned within said body section, said spring member engaging said annular flange and extending external of the body section;

an engagement and fastening assembly positioned within and extending through said body section, said assembly having an engagement means at one end and a retaining means at an opposite end;

a non-conductive adjustable fastening means, said non-conductive fastening means being engageable with said assembly;

a conductive contact, said contact being mounted on said non-conductive adjustable fastening means; and wiring means for connecting the hood ornament alarm to the vehicle's horn system, wherein the bottom of the conductive body section and the conductive contact are spaced apart by the spring member with said spacing being adjustable by said adjustable fastening means.

6. A motor vehicle hood ornament alarm for use with a horn system comprising:

a hollow conductive body section having a substantially cylindrical bottom;

engagement means having a first end connected with a vehicle hood ornament, said engagement means adapted to be mounted within and extending through said hollow conductive body section;

an insulating retaining means connected with a second end of said engagement means;

a substantially circular conductive contact disposed on the retaining means, and flexible separating means for normally separating said conductive contact from said bottom of said conductive body section.

* * * * *